United States Patent [19]

Ootani

[11] Patent Number: 4,649,775
[45] Date of Patent: Mar. 17, 1987

[54] SWITCH-SELECTABLE TRANSMISSION CONTROL WITH SAFETY MECHANISM FOR TRANSMISSION-EQUIPPED VEHICLES

[75] Inventor: Masatoshi Ootani, Kawasaki, Japan

[73] Assignee: Mitsubishi Jidosha Kogyo Kabushiki Kaisha, Tokyo, Japan

[21] Appl. No.: 531,817

[22] Filed: Sep. 13, 1983

[51] Int. Cl.⁴ ............................................. B60K 41/18
[52] U.S. Cl. ........................................ 74/866; 74/335
[58] Field of Search ............... 74/866, 871, 856, 878, 74/335, 336 R, 365, 861; 364/424.1

[56] References Cited

U.S. PATENT DOCUMENTS

| | | |
|---|---|---|
| 3,420,328 | 1/1969 | Johnson et al. ........................ 74/861 |
| 3,703,109 | 1/1972 | Irie et al. ................................ 74/866 |
| 4,015,488 | 4/1977 | Akeson et al. ......................... 74/866 |
| 4,274,306 | 6/1981 | Yokoi et al. ........................... 74/866 |
| 4,350,057 | 9/1982 | Kishi et al. ............................. 74/866 |
| 4,411,174 | 10/1983 | Yokoi et al. ........................... 74/866 |
| 4,467,427 | 8/1984 | Magnusson ............................ 74/866 |
| 4,517,646 | 5/1985 | Magnusson et al. ................... 74/866 |

FOREIGN PATENT DOCUMENTS

| | | | |
|---|---|---|---|
| 0007739 | 2/1980 | European Pat. Off. ............. 74/866 |
| 0046845 | 3/1982 | European Pat. Off. ............. 74/878 |
| 2048400 | 4/1971 | Fed. Rep. of Germany ........ 74/866 |
| 2105931 | 8/1971 | Fed. Rep. of Germany ........ 74/866 |
| 2447860 | 4/1976 | Fed. Rep. of Germany ........ 74/866 |
| 2019509 | 10/1979 | United Kingdom ................. 74/878 |

Primary Examiner—Leslie Braun
Assistant Examiner—David Novais
Attorney, Agent, or Firm—Robert E. Burns; Emmanuel J. Lobato; Bruce L. Adams

[57] ABSTRACT

A switch-selectable transmission control with a safety mechanism that changes gear ratios by automatically actuating gearshift solenoid valves according to the signal from a gear-selection switch is provided to a vehicle whose transmission is controlled from a finger-touch switchboard. With a vehicle speed limit preset for each gear, the transmission control allows a gearshift if the vehicle speed is within the preset limit, while it forcibly maintains the transmission in neutral, whichever gear is selected, when the vehicle speed is outside the preset limit. By so doing, the transmission control prevents hazardous gearshifts.

12 Claims, 5 Drawing Figures

SWITCH-SELECTABLE TRANSMISSION CONTROL WITH SAFETY MECHANISM FOR TRANSMISSION-EQUIPPED VEHICLES

BACKGROUND OF THE INVENTION

1. Field of the Invention

This invention relates to a switch-selectable transmission control with a safety mechanism for transmission-equipped vehicles.

2. Description of the Prior Art

FIGS. 1 and 2 show a conventional finger-touch selectable transmission that achieves gearshift by shifting the position of the gearshift fork longitudinally (as indicated by arrow (A) and laterally (as indicated by arrow (B).

Gearshift is done in accordance with the control signals outputted from an electric gearshift circuit d that receives selection signals from a finger-touch gear-selection switch c and controls the opening and closing of solenoid valves a1 and a2 (which permit gearshifts in direction A in FIG. 1) and b1 and b2 (which permit gearshifts in direction B in FIG. 1).

Such a conventional transmission control, however, allows a gearshift to be accomplished even when there is a wide gap between the vehicle speed and the rotating speed of the engine if a push-button on the gear-selection switch c is depressed. A steep downshift from high gear to low gear, for example, can give rise to an engine overrun or a clutch burst.

SUMMARY OF THE INVENTION

This invention solves the aforementioned problem. The object of this invention is to provide a switch-selectable transmission control with a safety mechanism for use with transmission-equipped vehicles which prevents hazardous gearshifts by presetting a vehicle speed limit for each gear, allowing a gearshift if the vehicle speed is within the preset limit, and forcibly maintaining the transmission in neutral, whichever gear is selected, when the vehicle speed is outside the preset limit.

For achieving this object, the switch-selectable transmission control for transmission-equipped vehicles according to this invention comprises a gear-selection switch, an electric gearshift circuit that controls, via a logic circuit, the opening and closing of solenoid gearshift valves in accordance with the gear selection signals from the switch, a vehicle-speed limit setter that outputs the vehicle speed limit, as an electric signal, that permits a shift to the gear that has been selected based on the signal from the switch, a vehicle-speed sensor, and a comparator circuit that determines whether the shift to the gear selected by the switch is possible or not comparing an electric signal based on the detection signal from the vehicle-speed sensor with an electric signal from the vehicle-speed limit setter, with the comparator and logic circuits connected together to constitute a safety mechanism so that the shift to the gear selected by the switch is allowed when the judgement made by the comparator circuit is positive and not allowed, with the transmission kept in neutral, when the judgement is negative.

Because of this feature, the switch-selectable transmission control with a safety mechanism for transmission-equipped cars of this invention prevents hazardous gearshifts by presetting a maximum vehicle speed limit for each gear, allowing a gearshift if the vehicle speed is within the preset limit, and forcibly maintaining the transmission in neutral, whichever gear is selected, when the vehicle speed is outside the preset limit.

BRIEF DESCRIPTION OF THE DRAWINGS

FIG. 1 schematically shows the arrangement of speed-changing gears, while FIG. 2 is an overall block diagram.

FIG. 3 is an overall block diagram, while

FIG. 4 is a block diagram showing the principal part that is composed of an analog electric circuit.

DESCRIPTION OF THE PREFERRED EMBODIMMENTS

Referring now to the accompanying drawings, preferred embodiments of this invention will be described.

Figure 3:
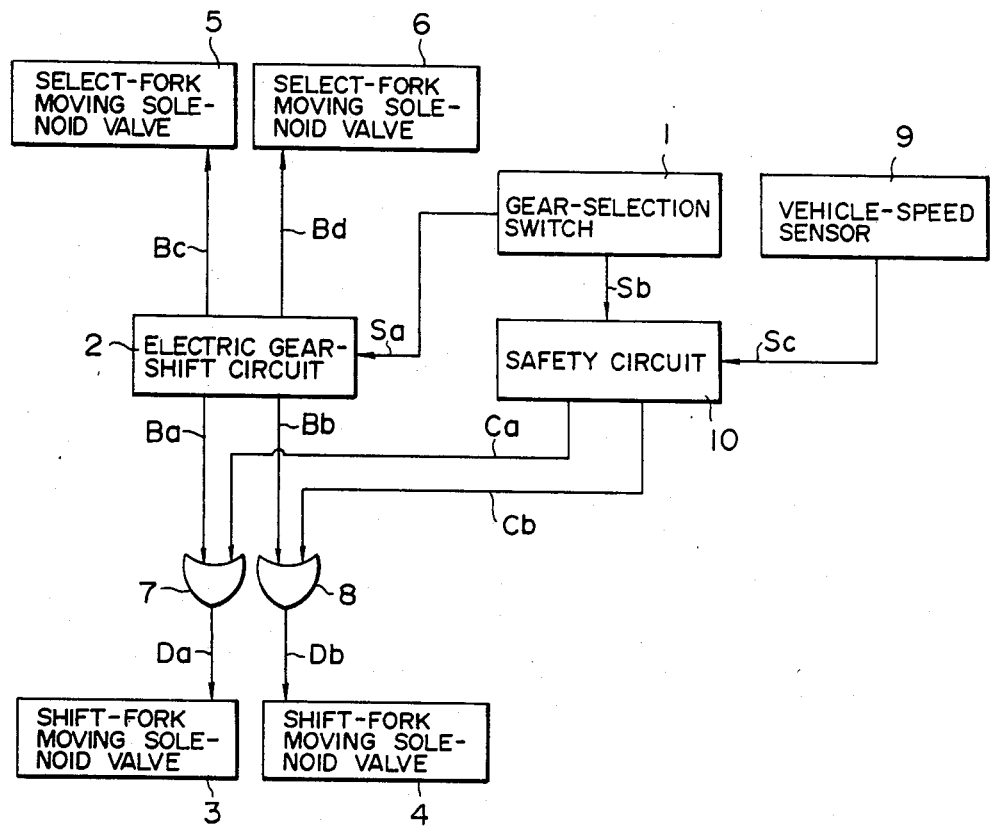
FIGS. 3 and 4 show a switch-selectable transmission control with a safety mechanism for transmission-equipped vehicles according to this invention.

Reference numeral 1 in FIG. 3 designates a gear-selection switch where a finger-touch selection of a transmission gear is made. Then, an electric signal Sa corresponding to the gear selection just made is supplied to an electric gearshift circuit 2.

Figure 1:
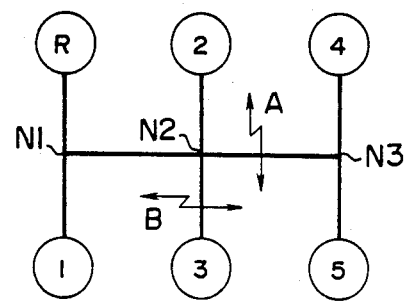
FIGS. 1 and 2 show a conventional switch-selectable transmission control for transmission-equipped vehicles.
Figure 2:
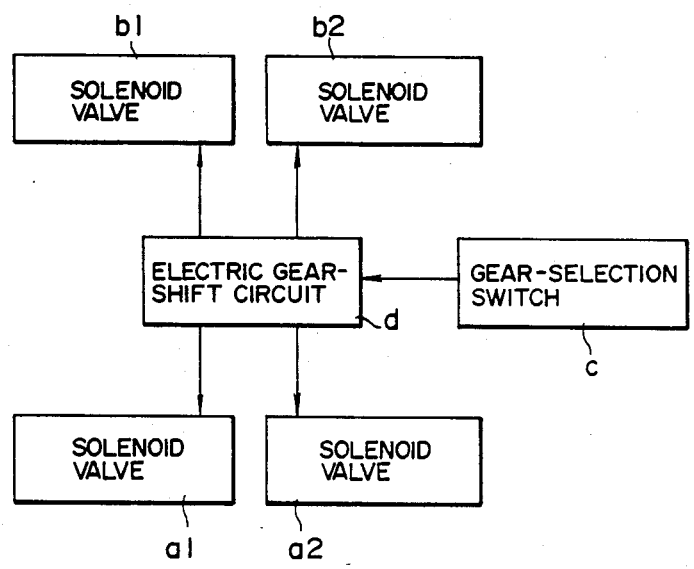

Adapted to output electric signals Ba, Bb, Bc and Bd that selectively open and close solenoid valves 5 and 6 that move a select-fork in the gearshift unit (laterally or in the direction identical with the direction B in FIG. 1) and solenoid valves 3 and 4 that move the shift-fork (longitudinally or in the direction identical with the direction A in FIG. 1) respectively on receipt of the gear-selection signal Sa, the electric gearshift circuit 2 is connected to the solenoid valves 3 and 4 via OR circuits 7 and 8 which serve as logic circuits and is connected directly to solenoid valves 5 and 6.

The signals Ba and Bb are supplied to the solenoid valves 3 and 4 via the OR circuits 7 and 8, while the signals Bc and Bd are supplied direct to the solenoid valves 5 and 6, respectively.

Responding to the signal inputted from the gear-selection switch 1, the electric gearshift circuit 2 outputs signals that open or close the solenoid valves 3, 4, 5 and 6 in accordance with predetermined sequences. Ultimately, the solenoid valves 3, 4, 5 and 6 are opened or closed as shown in the following table.

| Gear Selected | Solenoid Valve | | | |
|---|---|---|---|---|
| | 3 | 4 | 5 | 6 |
| R | Closed | Opened | Opened | Closed |
| N1 | Opened | Opened | Opened | Closed |
| 1 | Opened | Closed | Opened | Closed |
| 2 | Closed | Opened | Opened | Opened |
| N2 | Opened | Opened | Opened | Opened |
| 3 | Opened | Closed | Opened | Opened |
| 4 | Closed | Opened | Closed | Opened |
| N3 | Opened | Opened | Closed | Opened |
| 5 | Opened | Closed | Closed | Opened |

Provision is made so that when the solenoid valves 3 and 4 are simultaneously opened, the shift-fork is held in a longitudinal mid-position (corresponding to position N1, N2 or N3 in FIG. 1) or in neutral. When the solenoid valves 5 and 6 are simultaneously opened, the select-fork is held in a lateral mid-position (corresponding to position 2, N2 or 3 in FIG. 1).

A safety circuit 10 compares signal Sb from the gear-selection switch 1 with vehicle-speed pulse signal Sc corresponding to vehicle speed X from the vehicle-speed sensor 9 and initiates an electric signal to maintain the transmission in neutral when the vehicle speed is not appropriate for the gearshift.

Figure 4:
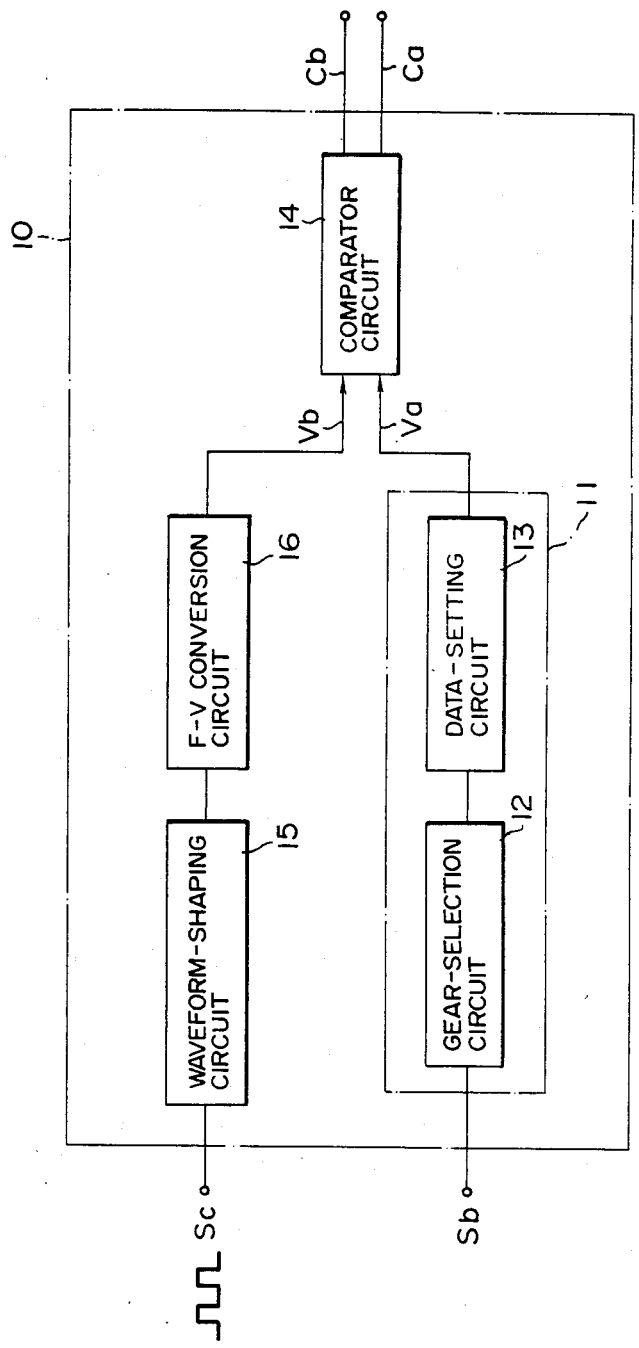

As shown in FIG. 4, the safety circuit 10 has a gear-shiftable vehicle-speed limit setter 11 that outputs an electric signal that indicates a gear-shiftable vehicle-speed limit corresponding to the gear selected based on the signal Sb from the gear-selection switch 1.

The gear-shiftable vehicle-speed limit setter 11 is provided with a gear-selection circuit 12 that selects the gear corresponding to the signal Sb from the gear-selection switch 1 and a data-setting circuit 13 that receives a signal from the gear-selection circuit 12, sets the upper limit $Y_i$ of the vehicle speed corresponding to the selected gear, and outputs voltage Va that corresponds to the setting $Y_i$. The output voltage Va of the data setting circuit 13 is supplied to a comparator circuit 14 as an output of the gear-shiftable vehicle-speed limit setter 11.

A waveform-shaping circuit 15 receives the vehicle-speed pulse signal Sc from the vehicle-speed sensor 9 that detects vehicle speed X and converts the amplitude of the vehicle-speed pulse signal Sc to an appropriate value. The signal whose peak value has been thus converted is supplied to a F-V conversion circuit (F-V converter) 16.

Adapted to convert into the voltage the frequency of the vehicle-speed pulse signal Sc whose amplitude has been converted, the F-V conversion circuit 16 outputs voltage Vb that is proportional to the number of waves of the pulse and supplied to the comparator circuit 14.

The comparator circuit 14 is an electric circuit that receives voltage Vb, which is an electric signal based on the detection signal from the vehicle-speed sensor 9, and voltage Va, which is an electric signal from the gear-shiftable vehicle-speed limit setter 11, and determines that the gearshift is possible if $Vb \leq Va$ or if the vehicle speed X is not higher than the gear-shiftable vehicle-speed limit $Y_i$. Then, two output terminals do not send out outputs Ca and Cb, as a sign to indicate that gearshift is possible. When gearshift is possible, low-level output of negative logic is supplied to the OR circuits 7 and 8, which constitute a logic circuit, as an output of the safety circuit 10.

If $Vb > Va$ or the vehicle speed X is higher than the gear-shiftable vehicle-speed limit $Y_i$, the comparator circuit 14 determines that gearshift is impossible. The two output terminals send out high-level outputs Ca and Cb to the OR circuits 7 and 8, as a sign to indicate that gearshift is impossible.

When either of the signal Ba from the electric gearshift circuit 2 or the signal Ca from the safety circuit 10 is supplied at high level, the OR circuit 7, which is a logic circuit, supplies high-level output Da to the solenoid valve 3 for actuation.

Functioning substantially like the OR circuit 7, the OR circuit 8 supplies high-level output Db to the solenoid valve 4 for actuation when either of the signals Bb and Cb is supplied at high level.

The comparator circuit 14 and the OR circuits 7 and 8, which are logic circuits, make up a safety mechanism.

When a gear is selected by operating the gear-selection switch 1, gearshift is allowed and performed accurately when the vehicle speed is not higher than the gear-shiftable vehicle-speed limit. When the vehicle speed is higher than the gear-shiftable vehicle-speed limit, on the other hand, gearshift is not allowed and the transmission is forcibly held in neutral with actuating signals sent to both of the shift-fork moving solenoid valves 3 and 4.

Figure 5:
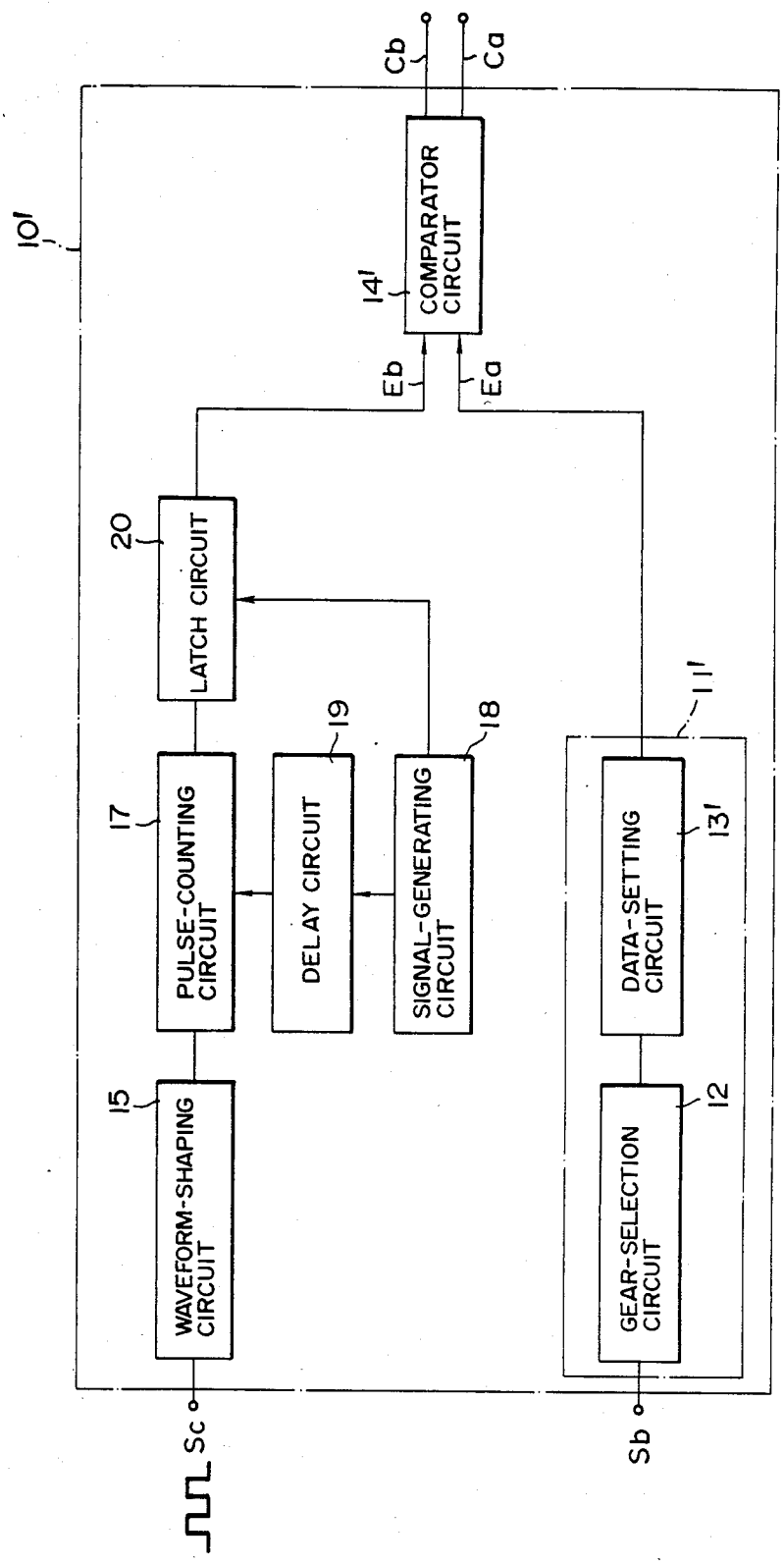
FIG. 5 is a block diagram showing a second embodiment of this invention in which the principal part is made up of a digital electric circuit.

FIG. 5 shows a second embodiment of this invention in which the principal part of the switch-selectable transmission control with a safety mechanism comprises a digital electric circuit. In FIG. 5, reference characters similar to those used in FIGS. 3 and 4 designate similar parts.

A gear-shiftable vehicle-speed limit setter 11' that constitutes a safety circuit 10' in FIG. 5 receives signal Sb from the gear-selection switch 1 and outputs digital signal Ea (M bits), which corresponds to the upper limit $Y_i'$ of vehicle speed, from a data-setting circuit 13', which is a multiplexer constituting the setter 11', to a comparator circuit 14'.

On receiving vehicle-speed pulse signal Sc, the safety circuit 10' converts the amplitude of the signal Sc and supplies the converted signal to a pulse-counting circuit (pulse counter) 17 to perform pulse counting.

The pulse-counting circuit 17 starts counting the number of pulse signals when it receives a counting start signal and repeats the counting at given time intervals as it receives a clearance signal, both signals being supplied from a signal-generating circuit 18 through a delay circuit 19. The result of the counting is constantly outputted in M bits to a latch circuit 20.

The latch circuit 20 is a circuit that latches the number of pulses from the pulse-counting circuit 17 based on the latch signals sent from the signal-generating circuit (osillator) 18. Namely, the latch circuit 20 counts and latches the number of pulses that are inputted between the pulse counting start signal that is inputted in the pulse-counting circuit 17 and said latch signal. The latched signal which corresponds to the vehicle speed is supplied to the comparator circuit 14' as a digital vehicle-speed signal Eb (M bits).

Comparing the digital signal Ea, which is a data-setting signal, and vehicle-speed signal Eb by, for example, subtraction, the comparator circuit 14' lowers the level of signals Ca and Cb when $Eb \leq Ea$ and raises their level when $Eb > Ea$.

Composed as described above, the second embodiment of this invention achieves substantially the same operation and result as the first embodiment described previously.

The data-setting circuits 13 and 13' shown in FIGS. 4 and 5 may be adapted to output not only the upper limit of the vehicle speed at which gearshift is allowed but also the lower limit in the form of voltage Vb' or setting data value Ea'. In this case, the comparator circuits 14 and 14' judge if the signal received falls between the upper and lower limits. This provision precludes the selection of high gear while the vehicle is running at low speed, thereby preventing the occurrence of knocks and other undesirable phenomena.

Also, a NOT circuit may be connected to the input terminal of the OR circuit or logic circuit shown in FIG. 3. When this is done, the electric gearshift circuit 2 and safety circuit 10 change the logic of their outputs. That is, low-level output is converted to high-level output and vice versa.

This logic changing provides a fail-safe function that assures safety of higher degree holding the transmission in neutral when the connection between the safety circuit 10 and the logic circuit is cut off.

A logic circuit that functions similar to the OR circuits 7 and 8 may be provided between the electric gearshift circuit 2 and each of the solenoid valves 5 and 6.

What is claimed is:

1. A switch-selectable transmission control with a safety mechanism for transmission-equipped vehicles which comprises:
   a gear-selection switch,
   an electric gearshift means that controls, via an OR circuit, the opening and closing of solenoid gearshift valves in accordance with the gear selection signals from said gear-selection switch,
   a gear-shiftable vehicle-speed limit setter that outputs the vehicle speed limit, as an electric signal, that permits a shift to the gear that has been selected based on the signal from said gear-selection switch, and sets the upper limit of the vehicle speed within which gear-shifting can be accomplished.
   a vehicle-speed sensor which detects vehicle speed, and
   a comparator means that determines whether the shift to the gear selected by said gear-selection switch is possible or not comparing an electric signal based on the detection signal from said vehicle speed sensor and an electric signal from said gear-shiftable vehicle-speed limit setter,
   said OR circuit opening the solenoid gearshift valves when either of the electric signals from the electric gearshift means and the comparator means is at high level,
   said comparator means and said OR circuit being connected together to constitute a safety mechanism so that the shift to the gear selected by said gear-selection switch is allowed when the judgement made by said comparator means is positive and not allowed, with the transmission kept in neutral, when the judgement is negative,
   said gear-shiftable vehicle-speed limit setter comprising a gear-selection means which selects the gear corresponding to the signal from said gear-selection switch, and a data-setting circuit which sets the upper limit of the vehicle speed corresponding to the signal from said gear-selection means and output a signal corresponding to the upper limit.

2. A switch-selectable transmission control with a safety mechanism according to claim 1, in which the solenoid valves serve as shift-fork moving solenoid valves and the safety mechanism supplies to said solenoid valves an electric signal to keep the transmission in neutral in the shifting direction when the comparator means judges that gearshift is impossible.

3. A switch-selectable transmission control with a safety mechanism according to claim 1, in which the solenoid valves serve as shift-fork and select-fork moving solenoid valves and the safety mechanism supplies to said solenoid valves an electric signal to keep the transmission in neutral in the shifting and selecting directions when the comparator means judges that gearshift is impossible.

4. A switch-selectable transmission control with a safety mechanism according to claim 1, in which the gear-shiftable vehicle speed limit setter sets the lower limit of the vehicle speed within which gear-shift can be accomplished.

5. A switch-selectable transmission control with a safety mechanism according to claim 1, in which the comparator means outputs a high-level signal when the level of the electric signal based on the detection signal from the vehicle-speed sensor is higher than the level of the electric signal from the gear-shiftable vehicle-speed limit setter.

6. A switch-selectable transmission control with a safety mechanism according to claim 1, in which a NOT circuit is provided between the output terminal of the comparator means and one of the input terminals of the OR circuit so that the OR circuit supplies signals to the solenoid valves in accordance with the electric signals of negative logic from the comparator means.

7. A switch-selectable transmission control with a safety mechanism according to claim 6, in which the comparator means outputs a low-level signal when the level of the electric signal based on the detection signal from the vehicle-speed sensor is higher than the level of the electric signal from the gear-shiftable vehicle-speed limit setter.

8. A switch-selectable transmission control with a safety mechanism according to claim 1, in which the vehicle-speed sensor outputs a pulse signal that corresponds to the running speed of the vehicle.

9. A switch-selectable transmission control with a safety mechanism according to claim 8, in which a frequency-to-voltage conversion circuit to convert the vehicle-speed pulse signal from the vehicle-speed sensor to a voltage signal to be supplied to the comparator means is provided.

10. A switch-selectable transmission control with a safety mechanism according to claim 1, in which the gear-shiftable vehicle-speed limit setter sets a digital signal of given bits, a pulse-counting circuit that counts the number of vehicle-speed pulses from the vehicle-speed sensor, a signal-generating circuit that generates signals to start and terminate said counting at given time intervals, and a latch circuit of given bits to hold the obtained value on completion of said counting are provided, and the comparator means functions as a subtractor of given bits that performs subtraction between the digital signals supplied from the gear-shiftable vehicle-speed limit setter and latch circuit.

11. A switch selectable transmission control with a safety mechanism for transmission-equipped vehicles having solenoid gearshift valve which comprises:
   a gear-selection switch means outputting electric gear selection signals,
   electric gearshift circuit means receiving electric gear selection signals from said gear selection switch means,
   means connecting said electric gearshift circuit means with said solenoid gearshift valves for controlling said solenoid gearshift valves according to gear selection signals received from said gear-selection switch means, said connecting means including circuit means between said electric gearshift circuit means and at least certain solenoid gearshift valves,
   vehicle speed sensing means for detecting vehicle speed and outputting electric signals representing vehicle speed,
   safety circuit means receiving gear selection signals from said gear-selection switch means and vehicle-speed signals from said vehicle speed sensing means, and means connecting said safety circuit means with said logic circuit between said electric gearshift circuit means and solenoid shift valves, said safety circuit means comprising gear-selection circuit means receiving gear-selection signals from said gear-selection switch means, data-setting circuit means which receives a signal from the gear-selection circuit means and sets the upper limit of vehicle speed corresponding to the selected gear and outputs a signal that corresponds to said upper limit, waveform-shaping circuit means which receives vehicle speed signals from said vehicle speed sensing means, pulse-counting circuit means which receives and counts pulse signals received from said waveform-shaping circuit means, signals-generating circuit means and cooperating delay circuit means for supplying periodic counting start signals to said-pulse-counting circuit means, latch circuit means for latching the number of pulses received from said pulse-counting circuit means between successive counting start signals, the latched signal corresponding to the vehicle speed, and comparator circuit means for comparing the output signals of said data-setting circuit means and said latch circuit means and outputting to said OR circuit means a control signal to maintain said transmission in neutral when the vehicle speed is not appropriate for the selected gearshift.

12. A switch-selectable transmission control according to claim 11, in which said safety circuit means comprises, gear-selection circuit means receiving gear-selection signals from said gear-selection switch means, data-setting circuit means which receives a signal from the gear-selection circuit means and sets the upper limit of vehicle speed corresponding to the selected gear and outputs a signal that corresponds to said upper limit, waveform-shaping circuit means which receive vehicle-speed signals from said vehicle speed sensing means and connects the amplitude of the vehicle-speed signals to an appropriate value, frequency-voltage converter means receiving the output of said waveform-shaping circuit and outputting a signal corresponding to vehicle speed, and comparator circuit means for comparing the output signals of said data-setting circuit means and said frequency voltage converter means and outputting to said logic circuit means a control signal to maintain said transmission in neutral when the vehicle speed is not appropriate for the selected gearshift.

* * * * *